United States Patent Office 2,981,628
Patented Apr. 25, 1961

2,981,628
ANTIOXIDANT COMPOSITION
Lloyd A. Hall, Chicago, Ill., assignor to The Griffith Laboratories, Inc., Chicago, Ill., a corporation of Illinois No Drawing. Filed Mar. 18, 1954, Ser. No. 417,224

1 Claim. (Cl. 99—163)

This invention relates to the stabilization of food materials normally subjected to oxidative rancidity. It is particularly of value as an anti-oxidant in food shortening such as lard, since it imparts long shelf-life or non-rancid keeping time and a high "carry-through" to food products following baking.

The antioxidant of the present invention is di-tertiary-butyl-para-cresol, also known as 2,6-di-tertiary-butyl-4-methyl-phenol, and known also as butylated hydroxy toluene. This material can be used in very small proportions, gives long shelf-life to fat and oil products, and "carry-through" to baked products such as crackers and cookies made from them. It is also useful with fats or oils of either vegetable or animal origin.

The product is non-toxic.

The product is not only antioxidant, itself, but forms synergistic mixtures with other well known antioxidants.

Examples of such synergistic antioxidant compositions are as follows:

*Example 1*

| | Lbs. |
|---|---|
| di-Tertiary-butyl-para-cresol | 15.00 |
| Propyl gallate | 3.34 |
| Citric acid | 3.74 |
| Lecithin | 22.68 |
| Corn oil | 55.24 |
| Total | 100.00 |

*Example 2*

| | |
|---|---|
| di-Tertiary-butyl-para-cresol | 26.40 |
| Propyl gallate | 6.70 |
| Anhydrous citric acid | 3.35 |
| Lecithin | 20.10 |
| Corn oil | 43.45 |
| Total | 100.00 |

*Example 3*

| | |
|---|---|
| di-Tertiary-butyl-para-cresol | 20.00 |
| Butylated hydroxy anisole | 6.00 |
| Citric acid | 4.00 |
| Propylene glycol | 70.00 |
| Total | 100.00 |

*Example 4*

| | |
|---|---|
| di-Tertiary-butyl-para-cresol | 14.00 |
| Butylated hydroxy anisole | 14.00 |
| Lard oil | 72.00 |
| Total | 100.00 |

*Example 5*

| | |
|---|---|
| di-Tertiary-butyl-para-cresol | 33.00 |
| Citric acid | 3.35 |
| Lecithin | 20.10 |
| Corn oil | 43.55 |
| Total | 100.00 |

*Example 6*

| | |
|---|---|
| di-Tertiary-butyl-para-cresol | 20.00 |
| Anhydrous citric acid | 4.00 |
| Fatty monoglyceride | 16.00 |
| Corn oil | 60.00 |
| Total | 100.00 |

*Example 7*

| | |
|---|---|
| di-Tertiary-butyl-para-cresol | 10.00 |
| Butylated hydroxy anisole | 10.00 |
| Anhydrous citric acid | 4.00 |
| Fatty monoglyceride | 16.00 |
| Corn oil | 60.00 |
| Total | 100.00 |

The fatty monoglyceride is preferably cottonseed monoglyceride.

These examples are used in oils or fats on the basis of from 0.005% to 0.02% of the di-tertiary-butyl-para-cresol. The amount of di-tertiary-butyl-para-cresol can be varied within these limits, maintaining the same proportions of propyl gallate, citric acid, and lecithin with respect to it which are shown in the above examples. The residue of the composition may then be made up with corn oil, assuming 8 ounces of the complete antioxidant composition for 1,000 lbs. of lard or other fat or oil.

Olive oil or cottonseed oil, lard oil, oleo, or other vegetable or animal oils may be used in place of the corn oil.

As an example of making the foregoing examples, anhydrous citric acid may be added to corn oil, previously heated to 265° F. The citric acid is added over a period of approximately 3 minutes and the mixture stirred continuously during this addition and for 45 minutes thereafter, until substantially complete reaction occurs. During this time, the temperature is maintained at about 265° F. The mixture is then cooled slowly to 120° F. and agitation continued for about 20 minutes. The temperature is then raised to 160° F. and the propyl gallate added with vigorous agitation for 15 minutes while maintaining the temperature at 160° F. After cooling to about 120° F., the di-tertiary-butyl-para-cresol is added, stirring slowly for about 20 minutes.

The citric acid and lecithin in Example 5 are incorporated as lecithin citrate in order to make the material oil and fat soluble. This preparation may be carried out as described in the application of C. L. Griffith and L. Sair, Serial No. 295,572, filed June 25, 1952, which issued on October 23, 1956, as Patent No. 2,768,084.

In Example 3 where propylene glycol is used as a solvent, the di-tertiary-butyl-para-cresol and butylated hydroxy anisole are dissolved in the propylene glycol with agitation at a temperature of approximately 120° F., together with the citric acid.

In Example 4, the di-tertiary-butyl-para-cresol and butylated hydroxy anisole are dissolved in the lard oil with agitation at a temperature of 120°–125° F.

When tested with lard, the following improvement was obtained with respect to the A.O.M. test and the Schaal Keeping Test.

| | A.O.M., Hours | Schaal Keeping Test, Days |
|---|---|---|
| Control, no antioxidant | 4.5 | 17 |
| di-tertiary-butyl-para-cresol, 0.01% | 13 | 27 |
| di-tertiary-butyl-para-cresol, 0.02% | 20 | 27 |
| Control, no antioxidant | 6.5 | 17 |
| di-tertiary-butyl-para-cresol, 0.005% | 20.0 | |
| di-tertiary-butyl-para-cresol, 0.01% | 26.0 | 27 |
| Butylated hydroxy anisole, .01% | 27.0 | 31 |
| di-tertiary-butyl-para-cresol, 0.015% | 34.0 | |
| di-tertiary-butyl-para-cresol, 0.02% | 38.0 | 40 |
| di-tertiary-butyl-para-cresol, 0.01% plus .003% citric | 30.0 | |
| Example 1 (8 oz. per 1,000 lbs. lard) | 41.0 | |

One of the great advantages of Examples 1, 2, 4, and 5 here shown is that the compositions are completely oil and fat soluble. The examples are all liquids. Example 3 is also water miscible.

This application is a continuation-in-part of my co-pending application, Serial No. 393,950, filed November 23, 1953, now abandoned, and continuation-in-part application Serial No. 680,008, filed August 23, 1957, which issued as Patent No. 2,813,032 on November 12, 1957, wherein methods of preparing fatty monoglyceride citrate are described. In the examples of the present application where fatty monoglyceride and citric acid are referred to separately, it is preferred that the citric acid all be in combined form with the fatty monoglyceride. The methods for preparing fatty monoglyceride citrate and solutions thereof in oil are more fully described in my co-pending application.

Butylated hydroxy anisole may, of course, be used in examples like 1 and 2, either with or without the propyl gallate but preferably along with it.

The foregoing detailed description has been given for clearness of understanding only and no unnecessary limitations should be understood therefrom as modifications will be obvious to those skilled in the art.

I claim:

An antioxidant composition comprising a solution in an edible oil of di-tertiary-butyl-para-cresol together with lecithin citrate.

References Cited in the file of this patent

UNITED STATES PATENTS

| 2,638,475 | Ross | May 12, 1953 |
| 2,683,694 | Hoffman et al. | July 13, 1954 |
| 2,699,395 | Brown | Jan. 11, 1955 |
| 2,721,804 | Rosenwald | Oct. 25, 1955 |
| 2,759,829 | Mattil et al. | Aug. 21, 1956 |

OTHER REFERENCES

Kraybill et al.: Am. Meat Inst. Found., Bulletin 4, January 1949, 6 pages.